United States Patent
Tavella

(10) Patent No.: US 9,955,773 B1
(45) Date of Patent: May 1, 2018

(54) COSMETIC CONTAINER ORGANIZER WITH REARWARD SLOPING COMPARTMENTS

(71) Applicant: Andrea Tavella, North Bay Village, FL (US)

(72) Inventor: Andrea Tavella, North Bay Village, FL (US)

( * ) Notice: Subject to any disclaimer, the term of this patent is extended or adjusted under 35 U.S.C. 154(b) by 0 days. days.

(21) Appl. No.: 15/342,174

(22) Filed: Nov. 3, 2016

(51) Int. Cl.
*A45D 44/00* (2006.01)
*A47G 29/08* (2006.01)
*F16B 47/00* (2006.01)

(52) U.S. Cl.
CPC .............. *A45D 44/00* (2013.01); *A47G 29/08* (2013.01); *F16B 47/00* (2013.01)

(58) Field of Classification Search
CPC ......... A45D 44/00; A47G 29/08; F16B 47/00; A47F 10/06; A47F 1/04; A47F 1/06; A47F 1/08; A47F 1/14; B05B 11/3056
USPC ........................................................ 211/65
See application file for complete search history.

(56) References Cited

U.S. PATENT DOCUMENTS

| | | | |
|---|---|---|---|
| 727,166 A * | 5/1903 | Harrison et al. ........ | A61B 50/10 312/209 |
| 3,476,123 A | 11/1969 | Flax | |
| 3,644,010 A * | 2/1972 | Murphy .................... | A47F 3/10 206/1.5 |
| 3,874,758 A * | 4/1975 | Isaacs ....................... | A47F 1/04 312/126 |
| 4,589,430 A | 5/1986 | Sussman | |
| 4,776,650 A | 10/1988 | Ferenzi | |
| 4,807,773 A | 2/1989 | Tsai | |
| 5,163,561 A * | 11/1992 | Fitzgerald ............. | A46B 5/0095 15/145 |
| 5,615,779 A * | 4/1997 | Marsilio ............... | A47B 81/068 211/40 |
| 5,636,752 A * | 6/1997 | Gallagher ............. | A47B 81/068 206/387.15 |
| 5,680,933 A * | 10/1997 | Miller .................... | A61C 15/043 132/309 |
| 5,791,748 A * | 8/1998 | Marhefka ............ | A47B 81/068 206/308.1 |
| 5,839,587 A * | 11/1998 | Gress ....................... | A47F 1/08 211/187 |
| 5,988,405 A * | 11/1999 | Weisenburger ......... | A47F 7/146 211/40 |
| 6,179,102 B1 | 1/2001 | Weber et al. | |
| 6,352,161 B1 * | 3/2002 | Huang .................. | A47B 81/068 211/40 |
| 7,533,776 B2 * | 5/2009 | Nickerson ............. | A47B 81/007 211/74 |
| 7,591,382 B2 | 9/2009 | Brock | |

(Continued)

FOREIGN PATENT DOCUMENTS

WO   2010042040 A1   4/2010

*Primary Examiner* — Ko H Chan

(57) ABSTRACT

A vertically oriented cosmetic container organizer is disclosed. The cosmetic container organizer includes a vertically oriented housing having a front end, a back end, a planar bottom end and two opposing sides. A plurality of compartments is disposed within the housing. Each of the compartments has an open front end that is above a rear end of the compartment defining a rearward sloping lower surface. At least one fastener coupled to the back end of the housing for mounting the container to a wall.

9 Claims, 14 Drawing Sheets

(56) References Cited

U.S. PATENT DOCUMENTS

| | | |
|---|---|---|
| 7,740,370 B2 | 6/2010 | Campbell et al. |
| 7,975,705 B2 | 7/2011 | Chen |
| 8,727,559 B2 | 5/2014 | Boyer |
| 9,332,814 B2 | 5/2016 | Brock |
| 2004/0108796 A1 | 6/2004 | Brower |
| 2006/0006772 A1 | 1/2006 | Galindo et al. |
| 2009/0320874 A1 | 12/2009 | Boye et al. |
| 2013/0048009 A1 | 2/2013 | Crapet et al. |
| 2014/0261533 A1 | 9/2014 | Brock |
| 2014/0299151 A1 | 10/2014 | Stroud |

* cited by examiner

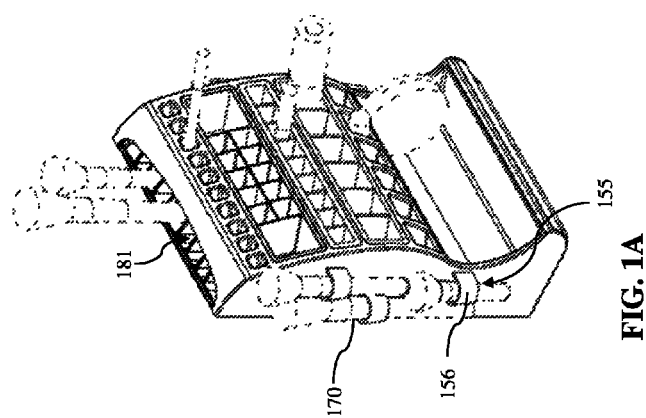

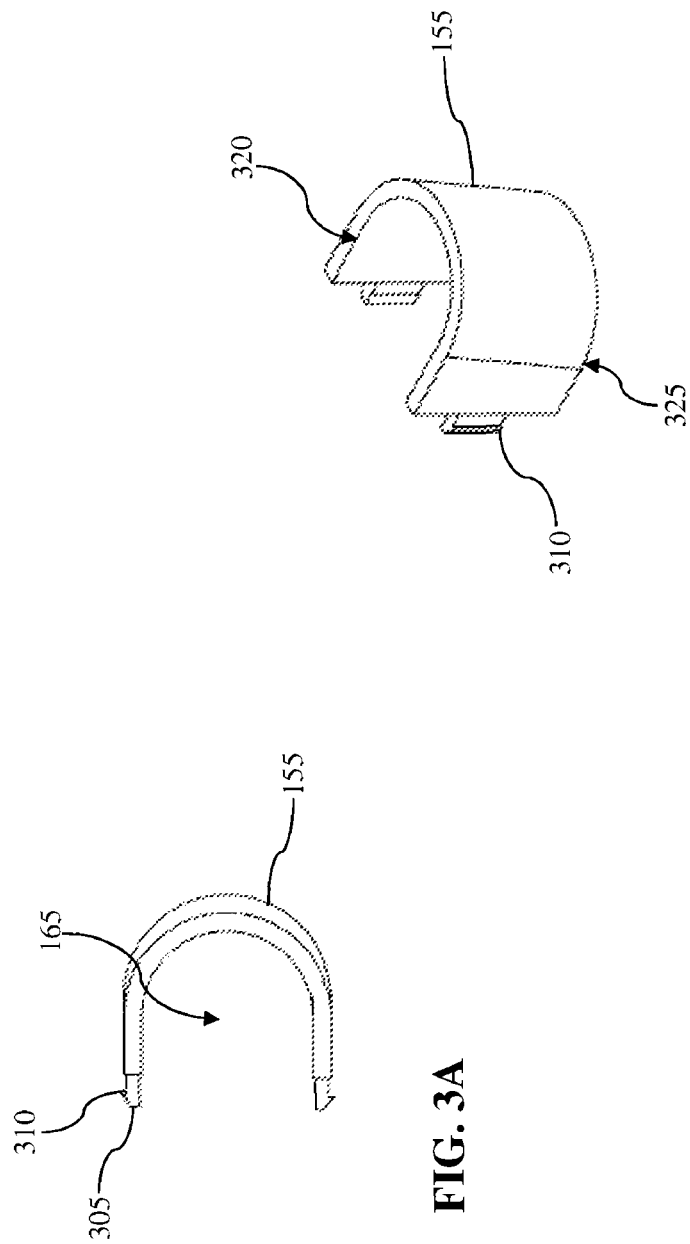

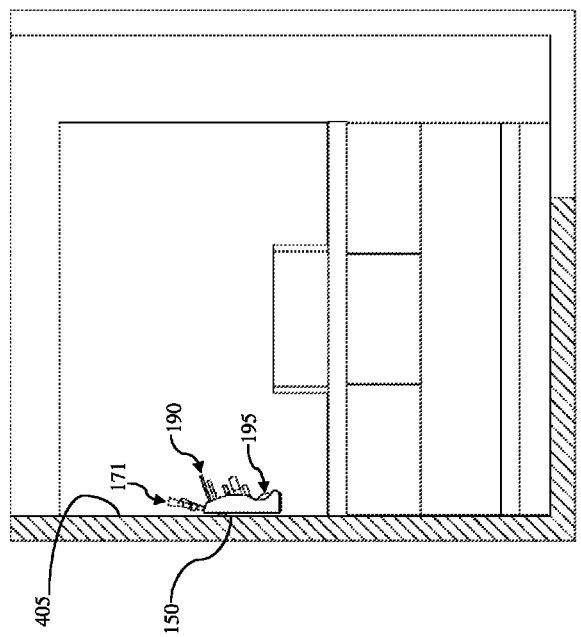

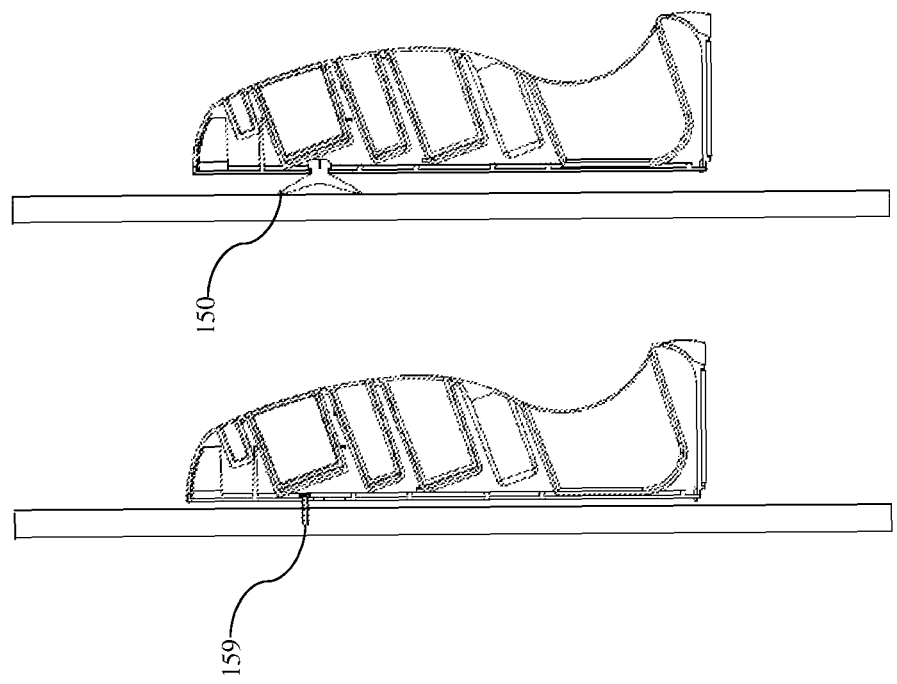

COSMETIC CONTAINER ORGANIZER WITH REARWARD SLOPING COMPARTMENTS

TECHNICAL FIELD

The present invention relates to the field of cosmetic organizers, and more specifically to cosmetic organizers providing ease of use and access to cosmetics.

BACKGROUND

Cosmetic are stored in a variety of shapes and sizes types of containers and dispensers. When the word cosmetics is used, this can mean cosmetics for both males, females and unisex products. When the word cosmetic container means a container used to store lipsticks, compacts, creams, deodorants, perfumes, colognes, nail care products, oral hygiene products, foundations, perfumes, balms, oils, liners, gloss, face primer, eyelid primer, lip cream, lipstick, lip liner, lip plumper, lip booster, concealer, face powder. etc. as well as other items such as lipstick pencils, eyeshadow pencils, eyebrow pens, brushes etc. Generally speaking, there are approximately twenty-eight (28) cosmetic categories of cosmetics, each having its own specific shape and size. In many cases, cosmetic and cosmetic containers can occupy a large amount of space when stored on a counter-top. This can be messy and decrease the amount of space for other items on-top of counters. Many times, with existing cosmetic container organizers, users must unzip pockets, open drawers etc., to have access to a certain cosmetic within a cosmetic container. This can be time consuming and cumbersome. Also, the existing cosmetic organizers having closed pockets, drawers or compartments can prevent a user from seeing or viewing a certain cosmetic or cosmetic container, which can result in a user forgetting about such cosmetic resulting in the underutilization of cosmetics.

For example, U.S Patent Application Publication 2004/0108796 discloses a modular organizing system. U.S Patent Application Publication 2004/0108796 discloses a vertically oriented cosmetic organizer having drawers. These drawers prevent the easy access by a user to the cosmetics. Similarly, U.S Patent Application Publication 2006/0006772 also discloses a vertically oriented organizer also having closures that prevent the easy access to the cosmetics. U.S Patent Application Publication 2009/0320874 discloses a pivoting tray making both sides accessible. However, similar to the above mentioned prior art, the pivoting tray prevents access by the user to at least one side of the tray at all times.

U.S. Pat. Ser. No. 4,776,650 discloses a wall mounted cosmetic center. However, a major problem with U.S. Pat. Ser. No. 4,776,650 is that the present invention is unable to positioned on a counter top. Another problem with U.S. Pat. Ser. No. 4,776,650 is that a user cannot efficiently store cylindrical containers or cosmetic pencils because such items would fall of the shelves of the invention.

As a result, there exists a need for improvements over the prior art and more particularly for a more efficient way of organizing cosmetics.

SUMMARY

A vertically oriented cosmetic container organizer is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a vertically oriented cosmetic container organizer is disclosed. The cosmetic container organizer includes a vertically oriented housing having an open front end, a back end, a planar bottom end and two opposing sides. A plurality of compartments is disposed within the housing. Each of the compartments has an open front end that is above a rear end of the compartment defining a rearward sloping lower surface. At least one fastener coupled to the back end of the housing is for mounting the container to a wall.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 1A is a perspective view of an illustration of the vertically oriented cosmetic container organizer, according to a second example embodiment;

FIG. 3A is a top view of an illustration of a u-shaped element of a brush holder of the cosmetic container organizer, according to an example embodiment;

FIG. 3B is a perspective view of an illustration of a u-shaped element of a brush holder of the cosmetic container organizer, according to an example embodiment;

FIG. 4A is a side view of an illustration of the cosmetic container organizer coupled by a fastener to a vertical surface, according to an example embodiment;

FIG. 5A is a cross-sectional side view of an illustration of the cosmetic container organizer coupled by a fastener to a vertical surface, according to an example embodiment;

FIG. 5B is a cross-sectional side view of an illustration of the cosmetic container organizer coupled by a second type of fastener to a vertical surface, according to an example embodiment;

DETAILED DESCRIPTION

Figure 1:
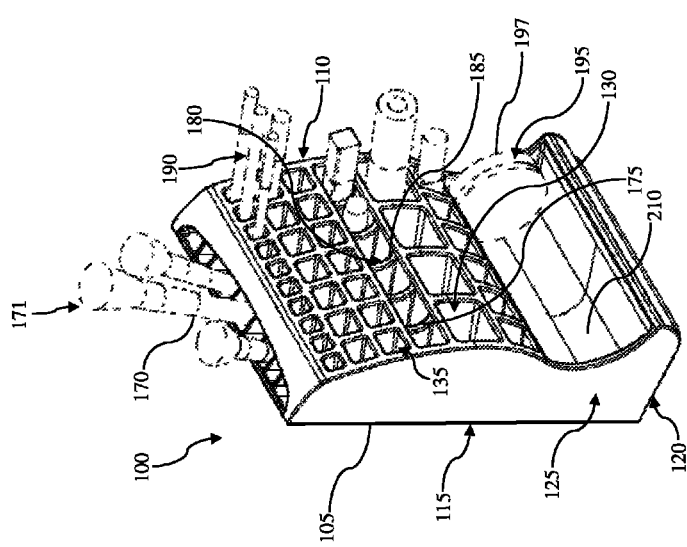
FIG. 1 is a perspective view of an illustration of the vertically oriented cosmetic container organizer, according to an example embodiment.
Figure 1B:
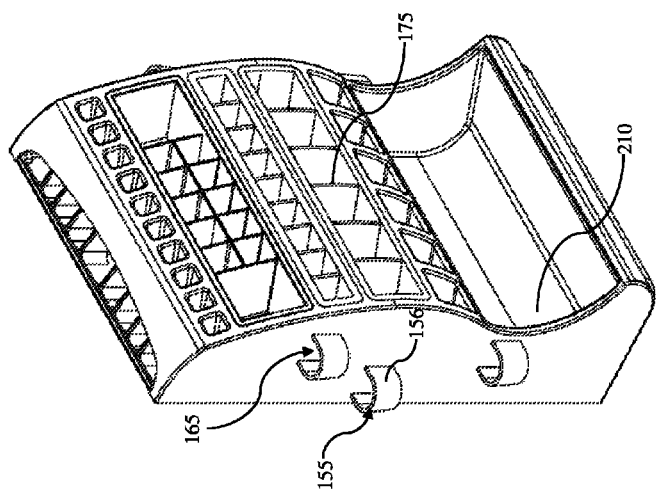
FIG. 1B is a perspective view of an illustration of the vertically oriented cosmetic container organizer, according to a third example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system that is vertically orientated and can be coupled to either a wall or vertical surface, or may be oriented vertically on a horizontal surface. The rearward sloping surfaces of the compartments of the cosmetic container organizer allow a consumer to easily view the various cosmetic containers stored within the cosmetic storage container. In one embodiment, one of the compartments also includes a curved element so that compact cases and other circular or cylindrical shaped cosmetic containers can be stored more efficiently. The present invention also improves over the prior by providing at least one supporting element at a bottom or lower end of the housing so that when the cosmetic container organizer is orientated on a horizontal surface the supporting element buttresses the cosmetic container organizer in the vertically orientated position. The cosmetic container organizer also contains separators or partitions further defining smaller compartments. The partitions may also include cut-outs defining a u-shape front end so that a user can more easily reach into each of the smaller compartments while still allowing the partitions or separators to function appropriately. In one embodiment, the present invention also improves over the prior art by providing fasteners on the back or closed end of the organizer. The fasteners are configured such that the organizer can be hung on a wall or vertical surface so that more counter-top case is available for other uses besides storing cosmetics. In one embodiment, a cosmetic container organizer may also include at least one insert compartment for receiving a removable insert. The removable may include a planar bottom end, such that the removable insert can be vertically orientated on a horizontal surface when not received by said insert compartment, and an open top end such that articles can be received within the insert. The removable insert is an improvement over the prior art because the insert allows a user to remove portions of the organizer to take when traveling or to position in a different location. This removable insert can also be stored inside the cosmetic container organizer with the cosmetic containers inside the organizer when in a travel mode increasing the versatility of the organizer.

Referring now to the Figures, FIG. 1 is a perspective view of the vertically oriented cosmetic organizer 100 according to an example embodiment. The cosmetic container includes a vertically oriented housing 105 having a front end 110, a back end 115, a planar bottom end 120 and two opposing sides 125. The housing may be fabricated from a variety of materials including wood, alloys, metals, composites, ceramics, polymeric materials such as polycarbonates, such as Acrylonitrile butadiene styrene (ABS plastic), Lexan™, and Makrolon™ However, other types of materials may also be used and are within the spirit and scope of the present invention. The housing may be formed from a single piece or from several individual pieces joined or coupled together. The components of the hosing may be manufactured from a variety of different processes including an extrusion process, a mold, welding, shearing, punching welding, folding etc. However, other types of processes may also be used and are within the spirit and scope of the present invention.

The housing includes a plurality of compartments 130 within the housing, wherein each of the compartments has an open front end 135 that is above a rear end 140 of the compartment defining a rearward sloping lower surface 145. In one embodiment, the compartment may be an elongated rectangular shaped compartment. The rearward sloping surface (more clearly illustrated in FIGS. 2A and 2B) of each compartment is unique in that it allows certain cosmetic containers such as pencils, pens, lip sticks, or other elongated shaped containers 190 to be positioned inside of each compartment, while allowing for easy access to each elongated cosmetic container. While only one cosmetic container 190 is illustrated in the compartments in FIG. 1, it is understood that the compartments may be sized such that more than cosmetic container may be received within each compartment. Each elongated compartment is sized and has a rearwardly sloping angle such that when an enlongated cosmetic container is positioned inside of the compartment, the rearwardly sloping surface causes and maintains the elongated cosmetic container within the compartment. The open front end 135 of each compartment also allows the consumer to view many cosmetic containers at one time. This is helpful so that the consumer can easily view and use many cosmetics. Many times, when a consumer cannot see what cosmetics she has, the consumer will forget what cosmetics are available. As a result, the present invention allow consumers to easily view all of cosmetic containers available and thus results in more appropriate utilization of cosmetics.

Each of the compartments are configured so that the open front end is accessible to a user from the front end of the container. The container also includes at least one fastener 150, 151 coupled to the back end of the housing for mounting the container to a wall (see FIGS. 2A, 2B, 4A-5B). Each of the fasteners may include a suction cup, hooks, bolt, set crews, opening configured to attached to protruding element, socket screws u-bolts, twine, etc. However, other types of fasteners may also be used and are within the spirit and scope of the present invention.

Referring to FIGS. 1A-1D, in one embodiment, the organizer may also include at least one brush holder 155 on at least one of the sides of the housing. In one embodiment, the brush holder comprises a u-shaped element 156 that is attached to the housing defining a receiving area 165. The receiving area is configured for holding a cosmetic brush handle 170.

Figure 3C:
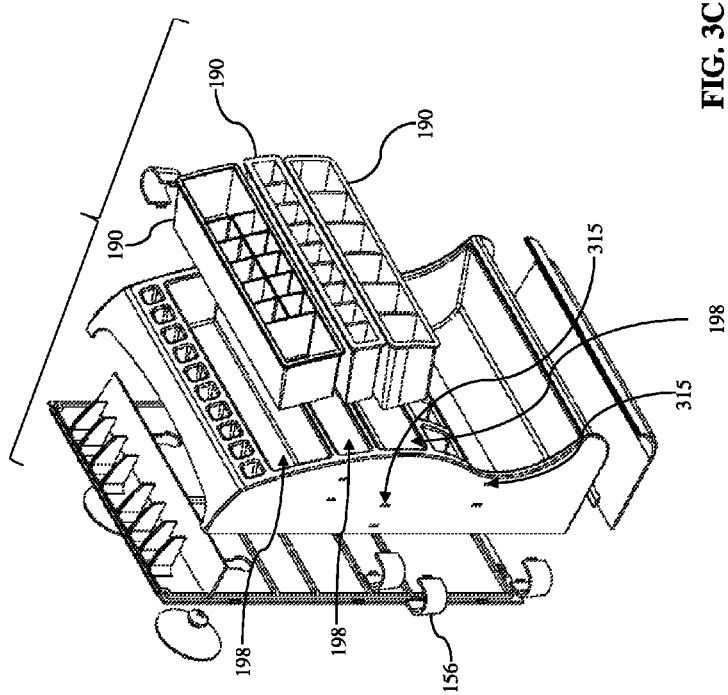
FIG. 3C is an exploded perspective view of an illustration of the cosmetic container organizer, according to an example embodiment.

FIGS. 3A-3B are a top view and a perspective view, respectively, of one embodiment of the u-shaped element 156 of the brush holder. In one embodiment, each end 305 of the U-shaped element has a catching feature 310 that is configured to mate with and catch holes 315 on the side of the housing (catch holes 315 FIG. 3C). The upper end 320 of the U-shaped element defines a wider receiving area than at the lower end 325 of the U-shaped element. As a result, of such decreasing cross-sectional diameter of the receiving area, the thicker end of the brush is unable to pass through the receiving area at the lower end of the brush thereby allowing the brush to remain on the side of the housing of the vertically orientated cosmetic container organizer when the brush handle 170 of the brush 171 is positioned inside of the brush holder. The u-shaped element may be formed from a single piece or from several individual pieces joined or coupled together. Each of the u-shaped element may comprise wood, alloys, metals, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. The u-shaped element may be formed from a single piece or from several individual pieces joined or coupled together. The components of the u-shaped element may be manufactured from a variety of different processes including an extrusion process, a mold, welding, shearing, punching welding, folding etc. However, other types of processes may also be used and are within the spirit and scope of the present invention.

Figure 1C:
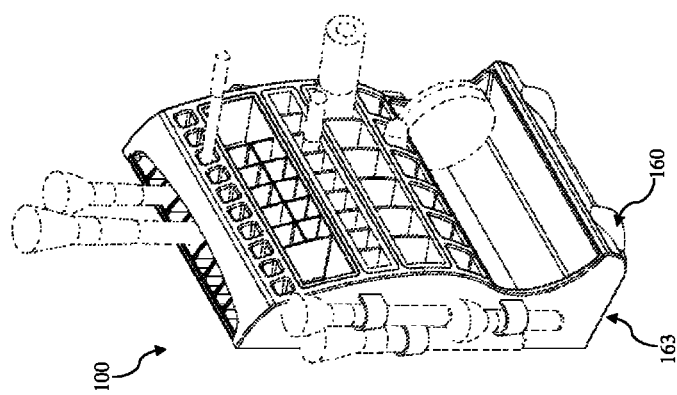
FIG. 1C is a perspective view of an illustration of the vertically oriented cosmetic container organizer, according to a fourth example embodiment.
Figure 1D:
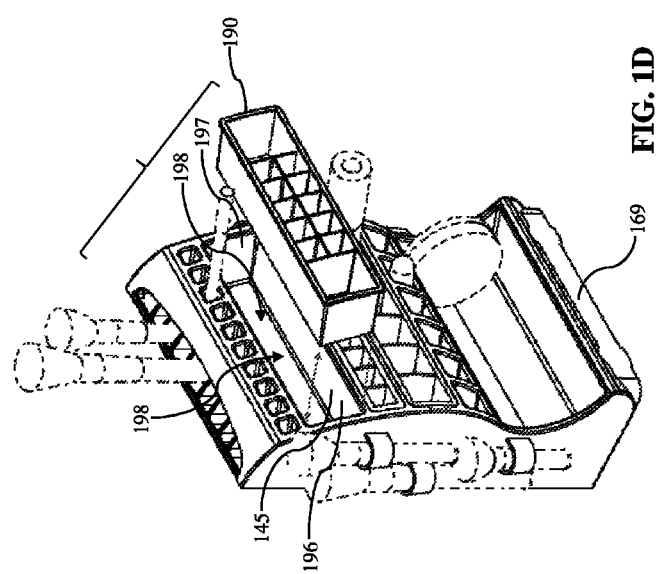
FIG. 1D is a partially exploded perspective view of an illustration of a removable insert removed from an insert compartment of the cosmetic container organizer, according to a fourth example embodiment.

Referring to FIGS. 1C and 1D, in one embodiment, the organizer may also include at least one supporting element 160, 169 positioned at the lower end of the housing. Each supporting element is configured to buttress the cosmetic container organizer when the cosmetic container organizer stands on a horizontal surface. Each of the supporting elements may comprise wood, alloys, metals, composites, ceramics, polymeric materials such as polycarbonates, such as Acrylonitrile butadiene styrene (ABS plastic), Lexan™, and Makrolon™. Each supporting element may be formed from a single piece or from several individual pieces joined or coupled together. The components of the supporting element may be manufactured from a variety of different processes including an extrusion process, a mold, welding, shearing, punching welding, folding etc. However, other types of processes may also be used and are within the spirit and scope of the present invention. In one embodiment, the supporting element comprises two feet or wedge shaped elements 160 at the front end of the housing. In other embodiments, the supporting element comprises 161 an elongated shaped bar 169 at the front end of the housing. The supporting elements are configured such that if the vertically orientated cosmetic container organizer is positioned on a horizontal surface, the supporting element provides additional stability to the organizer such that when forwardly forces act on the top end of the housing, the supporting elements have a buttressing effect and facilitate in maintain the organizer 100 upright.

Figure 2A:
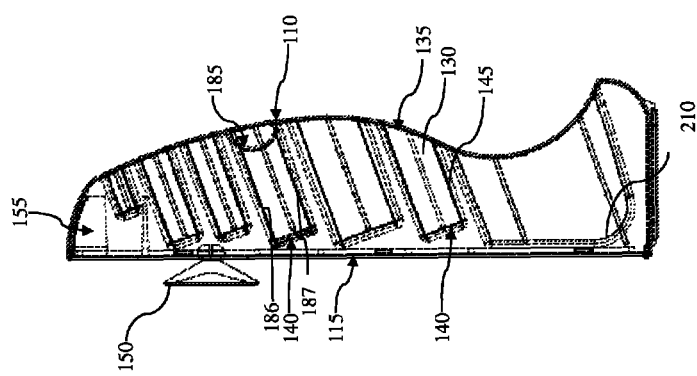
FIG. 2A is a cross-sectional side view of an illustration of the cosmetic container organizer, according to an example embodiment.
Figure 2B:
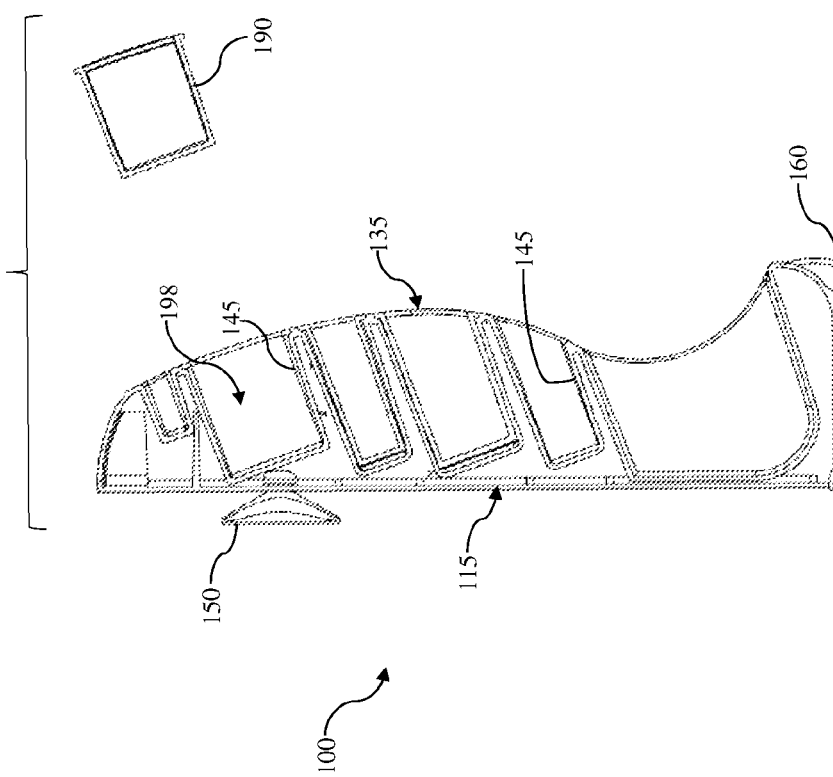
FIG. 2B is a partially exploded cross-sectional side view of an illustration of a removable insert removed from an insert compartment of the cosmetic container organizer, according to an example embodiment.

In one embodiment, at least one compartment also includes a partition 175 oriented perpendicular to a top panel 186 and bottom panel 187 of each compartment (illustrated in FIGS. 2A and 2B). Each of the partitions may comprise wood, alloys, metals, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. Each of the partitions may be used to decrease the size of each compartment so that such compartment is suitable less cosmetic containers to adjust the size of depending on the preference of the user. The partitions may be manufactured from a variety of different processes including an extrusion process, a mold, welding, shearing, punching welding, folding etc. However, other types of processes may also be used and are within the spirit and scope of the present invention. Additionally, in certain embodiments, as illustrated in FIG. 1 and FIG. 2A, each of the partitions may also include a cutout 180 at the front end 135 of the compartment defining a u-shaped feature 185. The u-shaped feature is unique in that it can allow a consumer to reach into the back end 140 of each compartment and hold an item more easily, while at the same time the body of the partition 175 allows goods to partitioned or separated between the compartments.

Figure 1E:
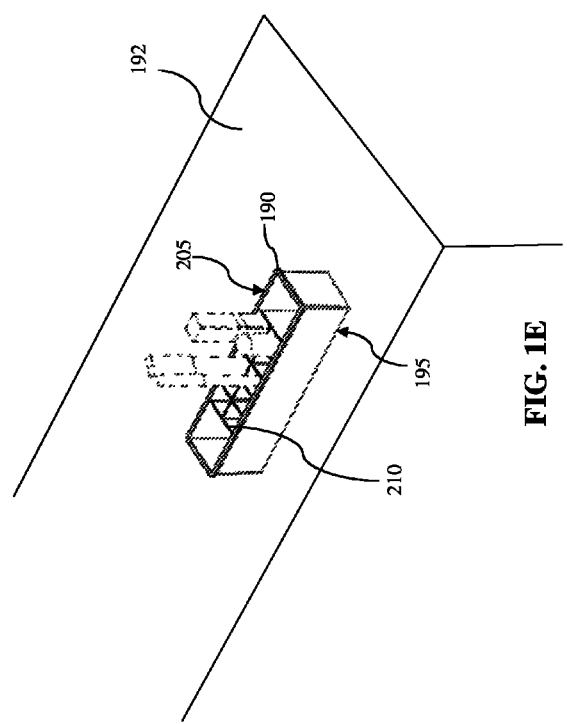
FIG. 1E is a perspective view of an illustration of a removable insert vertically aligned on a horizontal surface, according to an example embodiment.

Referring to FIGS. 1D, 1E, 3C, certain embodiments may also include at least one insert compartment 198 for receiving a removable insert 190. In the present embodiment, the insert compartment is a substantially rectangular shaped cutout or compartment within the housing that is adapted to receive a substantially rectangular shaped removable insert 190. The walls 196, 197 of the insert compartment are configured such that the bottom or lower panel comprises a rearwardly slanted surface 145. As explained above, the rearward slanted or sloping surface is configured so that when the removable insert 190 is inserted into the insert compartment, the slanted surface causes and maintains the cosmetic containers within the insert while allowing the consumer to easily view of any items that would be inserted into the compartments. The size of the insert compartment may be adjusted to the size of the removable insert. In certain embodiments, only one insert compartment and removable insert is used. In other embodiments, more than one removable insert may be used (see FIG. 3C).

The components of the removable insert 190 may be manufactured from a variety of different processes including an extrusion process, a mold, welding, shearing, punching welding, folding etc. However, other types of processes may also be used and are within the spirit and scope of the present invention. The removable insert may be formed from a single piece or from several individual pieces joined or coupled together. The removable insert may formed from wood, alloys, metals, composites, ceramics, polymeric materials such as polycarbonates, such as Acrylonitrile butadiene styrene (ABS plastic), Lexan™, and Makrolon™. However, other types of materials may also be used and are within the spirit and scope of the present invention. The removable insert 190 can be a substantially rectangular shaped container that is adapted to fit inside the insert compartment. The insert compartment includes at least a planar bottom end. The planar bottom end allows the insert compartment to be vertically orientated on a horizontal surface 192 when not received by said compartment as illustrated in FIG. 1E. The top end 205 of the insert compartment is open such that cosmetic containers such as pencils 190 may be received within the removable insert. The removable insert is helpful in that a person may remove the removable insert from the insert compartment of the organizer 100 so that the consumer can move the articles within the removable insert to a separate location. This allows for consumers to easily move a plurality of cosmetic containers while at the same time keeping the articles organizes and stored when not in use. As with the other compartments, the rearward sloping surface 145 within the insert compartment causes the removable insert's top end to be positioned above the lower end 210 when positioned inside of the insert compartment. (see FIG. 2B).

In one embodiment, the housing may also include at least one top compartment 181 that has an open end such that cosmetic containers or items may be inserted from above the housing and into the top end of the top compartment. Similar to the other compartments, the top compartments may define a variety of different types of shapes and sizes that is configured to receive a variety of different shapes of cosmetic containers and items, such as pencils, lipsticks, mascara, etc.

The organizer may also include at least one compartment having a back end defining a curved feature or shape 210. The curved shaped is configured to mate with the cured surface of cosmetic containers having a circular or cylindrical shape such as the cylindrical shape container 195 illustrated in FIG. 1. Because of the curved feature 210 proximate to the back end of the compartment, cylindrical and circular shaped cosmetic containers are stored side by side within the compartment resulting in a greater and more efficient use of space and less advertent displacement of the containers.

Referring to FIGS. 5A and 5B, as mentioned above the organizer may include at least one fastener 151, 150 that is configured to couple the back end of housing. In one non-limiting embodiment, the fastener may be a suction cup that is configured to easily couple the back end of the housing to a wall or other vertically oriented structure. Similarly, a fastener such as a screw 151 may be positioned within the wall such that the body of the screw is inserted into wall and the head of the screw fits within an opening on the back end of the housing (as illustrated in FIGS. 5A and 5B). Each of the fasteners may include a suction cup, hooks, bolt, set crews, opening configured to attached to protruding element, socket screws u-bolts, twine, etc. However, other types of fasteners may also be used and are within the spirit and scope of the present invention.

Figure 4B:
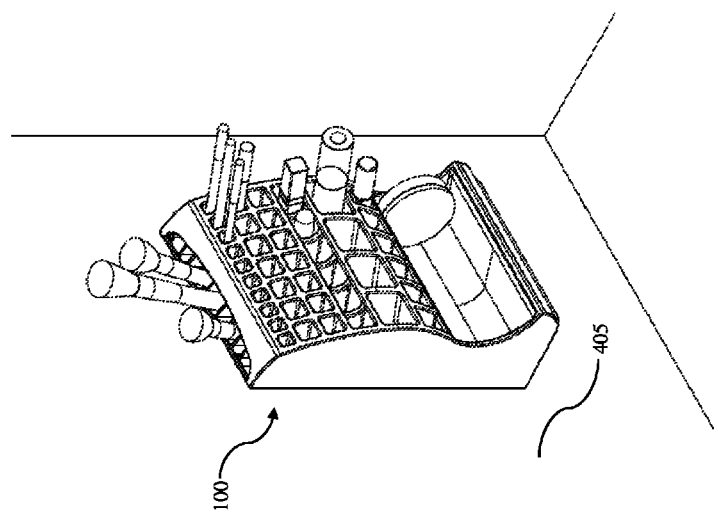
FIG. 4B is a perspective view of an illustration of the cosmetic container organizer coupled by a fastener to a vertical surface, according to an example embodiment.

FIGS. 4A-5B illustrate the organizer 100 in use in a variety of different configurations. FIG. 4A and FIG. 4B is a side view and perspective view, respectively, of an illustration of the cosmetic container organizer coupled by a fastener to a vertical surface or wall 405. In FIGS. 4A and 5B, at least one suction cup is the fastener used to attach the rear or back panel of the housing to the wall. As mentioned above, one of the key elements of the invention is that the rearward sloping slanted surface 145 allows elongated shaped cosmetic containers 190, 171 to be inserted into the compartments via the front end of the housing. This feature allows a user to store many articles within the view of the user, without having to search or rummage through a bag or another container to find the articles, and while preventing cosmetic containers from inadvertently falling out of the organizer. Additionally, FIGS. 4A and 4B also illustrate a cylindrical container 195 stored within a compartment having a curved element 210 or feature. This curved feature allows the curved surfaces of the cylindrical container 195 to mate with the curved element 210 so that the cylindrical containers can be stacked side by side easily and prevent inadvertent movement of the cylindrical containers.

Figure 4C:
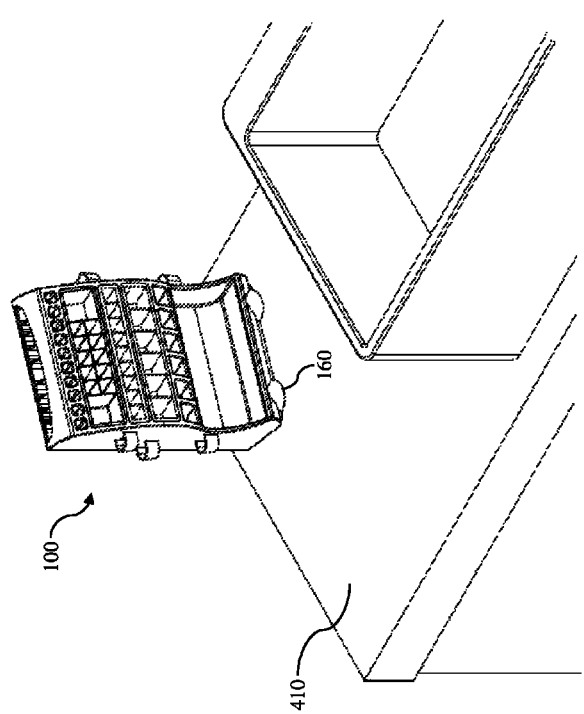
FIG. 4C is a perspective view of an illustration of the cosmetic container organizer positioned on top of a horizontal surface, according to an example embodiment.

FIG. 4C illustrates the organizer vertically situated or aligned on top of a counter or another horizontal surface 410. In the present embodiment, the supporting elements 160 coupled to the front end of the housing provide a buttressing feature so that the organizer is maintained in the vertical position even when not placed against a vertical surface or wall. This feature is also unique from other cosmetic organizers because it allows the organizer to be placed in different locations in a room while still having the stability required for use. FIG. 4C also illustrates the plurality of compartments having an open front so that a user can easily see all of the items or articles when inserted within the compartments while not having to rummage through or open compartments. This is helpful because when certain articles are not seen, they are less likely to be used by a consumer, which can be inefficient and sometimes create waste of time and money. While FIG. 4C illustrates two supporting elements, it is understood that additional supporting elements as well as only one supporting element may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A vertically oriented cosmetic container organizer comprising:
   a vertically oriented housing having a height substantially greater than a width and having an open front end, a back end, a planar bottom end and two opposing sides, the width having a serpentine taper and wherein the width is greater at the planer bottom than at a top end;
   a plurality of front compartments within the housing, wherein each of the front compartments has an open front end that is above a rear end of the front compartment defining a rearward sloping lower surface;
   at least one supporting element extending beyond a curved lower front end;
   wherein the vertically cosmetic container organizer is configured for decreasing toppling of the cosmetic container organizer when the cosmetic container organizer is on top a horizontal surface and not wall mounted; and,
   at least one fastener coupled to the back end of the housing for mounting the cosmetic container organizer to a wall.

2. The vertically oriented cosmetic container organizer of claim 1, wherein at least one side compartment on at least one of the sides, and the top end of the housing comprises at least one vertically orientated top compartment for maintaining items within the top end of the housing.

3. The vertically oriented cosmetic container organizer of claim 1, wherein said container further comprises at least one receiving front compartment for receiving a removable insert, and a removable insert comprising a planar bottom end, such that the removable insert can be vertically orientated on a horizontal surface when not received by said receiving front compartment, and an open top end such that articles can be received within the insert.

4. The vertically oriented cosmetic container organizer of claim 1, wherein each fastener is a suction cup.

5. The vertically oriented cosmetic container organizer of claim 1, wherein the back end of the at least one front compartment defines a curved shape.

6. A vertically oriented cosmetic container organizer comprising:

a vertically oriented housing having a height substantially greater than a width and an open front end, a back end, a planar bottom end and two opposing sides, the width having a serpentine taper and wherein the width is greater at the planer bottom than at a top end;

a plurality of front compartments within the housing, wherein each of the front compartments has a front end that is above a rear end of the front compartment defining a rearward sloping lower surface, and wherein at least one front compartment is for receiving a removable insert;

at least one vertically orientated top compartment within the top end of the housing for maintaining items within the top end of the housing and rearwardly oriented relative to at least one front compartment;

a removable insert comprising a planar bottom end, such that the removable insert can be vertically orientated on a horizontal surface when not received by said front compartment, and an open top end such that articles can be received within the insert;

at least one fastener coupled to the back end of the housing for mounting the cosmetic container organizer to a wall; and, at least one supporting element extending beyond a curved lower front end for decreasing toppling of the cosmetic container organizer when the cosmetic container organizer is on top a horizontal surface and not wall mounted.

7. The vertically oriented cosmetic container organizer of claim 6, wherein at least one side compartment on at least one of the sides, wherein the cosmetic container organizer is configured for receiving items on all sides except on the planar bottom end.

8. The vertically oriented cosmetic container organizer of claim 6, wherein cosmetic container organizer further comprises at least one front compartment comprising a partition oriented perpendicular to a top panel and bottom panel of each front compartment.

9. The vertically oriented cosmetic container organizer of claim 8, wherein at least one partition further comprises a cutout at a front end of the partition defining a substantially u-shaped front end.

* * * * *